US008834165B2

(12) United States Patent
Glaser et al.

(10) Patent No.: US 8,834,165 B2
(45) Date of Patent: Sep. 16, 2014

(54) UPSET RECOVERY TRAINING USING A SUSTAINED-G MULTI-AXIS PLATFORM OR A CENTRIFUGE

(75) Inventors: Scott Glaser, Rosamond, CA (US); Glenn B. King, Riverside, NJ (US); Richard A. Leland, Sellersville, PA (US)

(73) Assignee: Environmental Tectonics Corporation, Southampton, PA (US)

( * ) Notice: Subject to any disclaimer, the term of this patent is extended or adjusted under 35 U.S.C. 154(b) by 0 days.

(21) Appl. No.: 12/851,723

(22) Filed: Aug. 6, 2010

(65) Prior Publication Data

US 2011/0045446 A1    Feb. 24, 2011

Related U.S. Application Data

(60) Provisional application No. 61/273,607, filed on Aug. 6, 2009.

(51) Int. Cl.
| | | |
|---|---|---|
| *G09B 9/08* | (2006.01) | |
| *G09B 9/02* | (2006.01) | |
| *G09B 9/00* | (2006.01) | |
| *G09B 9/12* | (2006.01) | |

(52) U.S. Cl.
CPC ........................................ *G09B 9/12* (2013.01)
USPC ................................. 434/59; 434/55; 434/29

(58) Field of Classification Search
USPC ................................................ 434/59, 29, 55
See application file for complete search history.

(56) References Cited

U.S. PATENT DOCUMENTS 4,710,128 A * 12/1987 Wachsmuth et al. ........... 434/46

OTHER PUBLICATIONS

"FAA Airplane Upset Recovery training Aid, Revision 2", Oct. 2008. pp. 2.6-9, 3-B.52, 3-B.54, 3-B.64.*
FAA, "Airplane Flying Handbook", May 2004. pp. 4-12 too08 4-15.*
Verikios, Michael, "ETC to Deliver New Flight Simulator for Space Travelers and Aircrews in Japan" TDL Intl Edition (Daily Travel & Tourism Newsletter) Nov. 29, 2006.*
Rogers, Rodney O. et al., "Rogers, An Experiment to Evaluate Transfer of Low-Cost Simulator-Based Upset-Recovery Training", retrieved from the internet: <http://www.dtic.mil/cgi-bin/GetTRDoc?Ad=ADA500290&Location=U2&doc=GetTRDoc.pdf> retrieved on Oct. 25, 2010.

(Continued)

*Primary Examiner* — Sam Yao
*Assistant Examiner* — Peter J Alley
(74) *Attorney, Agent, or Firm* — O'Kelly Ernst & Bielli, LLC; Robert R. Axenfeld

(57) ABSTRACT

A process for providing upset recovery training (URT) includes using a sustained-G multi-axis platform (e.g., a centrifuge-based simulator). Various embodiments of the present invention address an important aspect of URT that is not present in the prior art, namely the placing of physiological stresses on the trainees during URT, such as sustained motions including, but not limited to, sustained, elevated G-forces and continuous rotational cues. Elevated, sustained, G-forces and continuous rotational cues can create many physiological challenges to aircrew. These challenges can include motion discomfort, disorientation, and visual disturbances. Embodiments of the present invention provide URT that includes physiological stresses on the pilot. If a pilot learns the correct procedures for recovery from an upset, as in the prior art URT programs, but cannot execute the procedures in the real world because he or she has not been prepared for the physiological environment to be faced, then safety is compromised.

26 Claims, 9 Drawing Sheets

(56) References Cited

OTHER PUBLICATIONS

Rogers, R. "Course Text All Attitude Flight and Upset Recovery", 2006, pp. 1-42, retrieved from the internet: <http://faculty.erau.edu/rogersr/as471/CourseText2006.doc> retrieved on Oct. 25, 2010, p. 13-p. 40.

Rogers, Rodney O. et al., "Rogers, Preliminary Results of an Experiment to Evaluate Transfer of Low-Cost, Simulator-Based Airplane Upset-Recovery Training", pp. 1-17, retrieved from the internet: <http://www.dtic.mil/cgi-bin/GetTRDoc?AD=ADA475565&Location=U2&doc=GetTRDoc.pdf> retrieved on Oct. 25, 2010.

Sparks, D.W. et al., "Optimal Aircraft Control Upset Recovery with and without Component Failures" Proceedings of the 2002 American Control Conference. Anchorage, AL, Ny, NY, IIEE, vol. 5, May 8-10, 2002, pp. 3644-3649.

Verikios, Michael, "ETC to Deliver New Flight Simulator for Space Travelers and Aircrews in Japan" TDL Intl Edition (Daily Travel & Tourism Newsletter) Nov. 29, 2006, retrieved from the internet: <http://www.traveldailynews.com/pages/print/16160-ETC-to-deliver-new-flight-simulator-for-space-travelers-and-aircrews-in-Japan> retrieved on Oct. 22, 2010.

\* cited by examiner

UPSET RECOVERY TRAINING USING A SUSTAINED-G MULTI-AXIS PLATFORM OR A CENTRIFUGE

CROSS-REFERENCE TO RELATED APPLICATIONS

This non-provisional application claims the benefit of US Provisional Application No. 61/273,607, filed 6 Aug. 2009, and entitled "A Process For Upset Recovery Training Using A Sustained-G Multi-Axis Platform Or A Centrifuge", the entirety of which is hereby incorporated by reference.

COPYRIGHT AUTHORIZATION LANGUAGE UNDER 37 CFR §1.71(e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an upset recovery training process that employs a sustained G-force multi-axis platform to train pilots in how to recover and gain control of their aircraft in an upset situation.

BACKGROUND

Accidents resulting from a loss of airplane control, sometimes referred to as airplane "upsets", are a major cause of fatalities in the commercial aviation industry.

The following unintentional flight conditions generally describe an airplane upset: pitch attitude greater than 25 degrees nose up; pitch attitude greater than 10 degrees nose down; bank angle greater than 45 degrees; and within the foregoing parameters, but flying at airspeeds inappropriate for the conditions.

The causes of airplane upset incidents are varied, however, they can be broken down into four broad categories, namely: environmentally induced; system-anomalies induced; pilot induced; and a various combinations of the foregoing categories.

Environmentally induced airplane upsets include the following: turbulence; clear air turbulence, mountain wave turbulence, wind shear, thunderstorms, microbursts, wake turbulence, and airplane icing.

Turbulence is characterized by a large variation in an air current over a short distance. It is caused by, among other things, jet streams, convective currents, obstructions to wind flow, and wind shear. Knowledge of the various types of turbulence assists in avoiding it, and, consequently, reduces the potential for an airplane upset.

Clear air turbulence (CAT) is defined as high-level turbulence, as it is normally above 15,000 MSL (mean sea level). It is not associated with cumuliform cloudiness. CAT is almost always present near jet streams. Jet streams are dynamic, and turbulence associated with them is difficult to predict. This area of turbulence can be 100 to 300 miles long, 50 to 100 miles wide, and 2000 to 5000 feet thick.

Mountains are the greatest obstructions to wind flow. This type of turbulence is classified as "mechanical." Lenticular clouds over mountains are a sure sign of mountain wave turbulence, but unfortunately the air may be too dry for the presence of the telltale clouds, increasing the likelihood of upsets.

Wind shear wind variations at low altitude are recognized as a serious hazard to airplanes during takeoff and approach. These variations can be caused by many differing meteorological conditions including, but not limited to, topographical, temperature inversions, sea breezes, frontal systems, strong surface winds, thunderstorms, and microbursts. Thunderstorms and microbursts are the two most violent forms of wind change.

The two basic types of thunderstorms are air mass and frontal. Air mass thunderstorms are randomly distributed in unstable air. Heated air rises to form cumulus clouds. The clouds develop in three stages: cumulus stage, mature stage, and dissipating stage. The gust front produced by the downflow and outrush of rain-cooled air can produce very turbulent air conditions.

Frontal thunderstorms are associated with weather system line fronts, converging wind, and troughs aloft. Frontal thunderstorms form in squall lines, last several hours, generate heavy rain and possibly hail, and produce strong gusty winds and possibly tornadoes. The downdraft of a typical frontal thunderstorm is large, about 1 to 5 miles in diameter. Resultant outflows may produce large changes in wind speed.

Microbursts can occur anywhere that convective weather conditions occur. Five percent of all thunderstorms produce microbursts. Downdrafts are typically only a few hundred to 3,000 feet across. The outflows are not always symmetrical. A significant airspeed increase may not occur upon entering outflows, or it may be much less than the subsequent airspeed loss experienced when exiting. Some microbursts are so severe that an aircraft cannot escape them.

Wake turbulence is a leading cause of airplane upsets that are environmentally induced. A pair of counter-rotating vortices is shed from an airplane wing, thus causing turbulence in the airplane's wake. The effect of turbulence on the aircraft is a function of airplane weight, wingspan, and speed. Vortices descend at an initial rate of 300 to 500 feet/minute for about 30 seconds. Pilots have likened a wake-turbulence encounter to be like hitting a wall. With little to no control input from the pilot, the airplane would be expelled from the wake and an airplane upset could result.

With regard to airplane icing, large degradation of airplane performance can result from the surface roughness of an extremely small amount of ice contamination. The handling characteristics and lift capability can be adversely affected. Therefore, the axiom of "keep it clean" for critical airplane surfaces continues to be a universal requirement.

System-anomalies induced airplane upsets can arise from the failure of items such as airplane systems (i.e., engines, electric, hydraulic, and flight controls), flight instruments and auto-flight systems as well as other anomalies. These types of failures can range from unrecoverable to survivable if the flight crew makes correct responses.

Airplane system failures involve the loss or degradation of one or more aircraft systems. Primary airplane systems include engines, electric, hydraulic, and flight controls. Emergency procedures are published for many systems failures. Successful resolution of a system failure involves the pilot recognizing the failure and maintaining aircraft control while executing the proper emergency procedure.

With regard to instrument failures, virtually all airplane operations manuals provide flight instrument system information that the pilot can analyze to select the correct procedural alternatives. Several accidents have pointed out that pilots are not always prepared to correctly analyze the alternatives in case of failure. The result can be catastrophic.

Auto-flight systems include autopilot, auto-throttles, and all related systems that perform automatic control of the aircraft, flight management, and guidance. The pilot community has tended to develop a great deal of confidence in these systems, which has led to complacency in some cases. Although quite reliable, failures do occur. These failures have led to airplane upsets and accidents.

Flight controls include primary flight controls (ailerons/spoilers, rudder, and elevator/stabilizer) and secondary flight controls (including trim surfaces, flaps, and speedbrakes). Flight control damage or failure can occur due to a variety of reasons including mechanical failure, bird strike, or overstress. These failures and other anomalies such as flap asymmetry, runaway trim and aileron/spoiler problems are addressed in airplane operations manuals. Airplane certification requirements ensure that pilots have sufficient information and are trained to handle these critical failures. However, it is the unexpected that can cause problems, and an accident.

With regard to pilot-induced airplane upsets, it has been known for many years that sensory inputs can be misleading to pilots, especially when pilots cannot see the horizon. To solve this problem, airplanes are equipped with flight instruments to provide the necessary information for controlling the airplane. However, a review of airplane upsets reveals that pilot inattention to, or neglect of, the airplane's performance can lead to extreme deviations from the normal flight envelope. Distractions can be very subtle, such as warning or caution lights illuminating during critical phases of flight, conflicting traffic, or radio calls during critical phases of flight. Many airplane upsets occur while the pilot is engaged in some task that takes attention away from the flight instruments.

Spatial disorientation has been a significant factor in many airplane upset accidents. The definition of spatial disorientation is the inability to correctly orient oneself with respect to the Earth's surface due to misinterpretation of the aircraft position and/or motion. We are all susceptible to sensory illusions. Pilots who perceive a conflict between bodily senses and the flight instruments and are unable to resolve the conflict are spatially disoriented. Allowed to continue, a spatial disorientation episode will likely lead to an airplane upset. Attention to flight instruments and a good cross-check are the keys to remaining spatially orientated.

The advancement of technology in today's modern airplanes has brought us flight directors, autopilots, autothrottles, flight management systems, and ground collision avoidance systems. When used properly, this technology contributes to flight safety and reduces crew workload. Complacent and improper use of these systems is a concern. The systems can and do fail, leading to airplane upsets and accidents.

Data from the U.S. National Transportation Safety Board show that between 1993 and 2002, there were 2,131 fatalities in loss of control accidents and that some of these fatalities were attributable to airplane upsets. See Docket No. SA-531 Exhibit No. 14-M National Transportation Safety Board Washington, D.C. Flight Safety Digest, July.

Another airline industry source reports that there were twenty-two in-flight, loss-25 of-control accidents between 1999 and 2008. (See Statistical Summary of Commercial Jet Airplane Accidents, Worldwide Operations, 1959-2008) These accidents resulted in more than 1,991 fatalities.

These accident and fatality statistics suggest that pilots need training so that they are better prepared to respond to airplane upset situations.

Many commercially trained pilots do not receive training in the procedures and techniques necessary to recover from an upset. See Airplane Upset Recovery Training Aid Revision 2, available online at flightsafety.org. Military pilots, on the other hand, receive upset recovery training, but the ratio of military trained pilots to commercially trained pilots in commercial aviation continues to shift toward more commercially trained pilots.

The goal of prior art upset recovery training was, since complete avoidance of upsets was not possible, that pilots should be trained to safely recover an airplane that has been upset.

The goal of prior art upset recovery training programs was, in a classroom situation, to increase the pilot's ability to recognize and avoid upset situations and to improve the pilot's ability to recover control, if avoidance is not successful.

Most prior art upset recovery training programs are, in a classroom setting, presented in three parts: (1) the causes of airplane upsets; (2) a brief review of airplane fundamentals; and (3) airplane upset recovery techniques.

Airplane manufacturers, airlines, pilot associations, flight training organizations, and government and regulatory agencies have developed these prior art training resources.

The goal of the prior art training aid has been to increase the ability of pilots to recognize and avoid situations that can lead to airplane upsets and to improve their ability to recover control of an airplane that has exceeded the normal flight regime.

The use of simulators in prior art upset recovery training ("URT") programs has not been well accepted because a traditional simulator cannot replicate the sustained motions and accelerations experienced in an actual upset situation. Many believe that use of a simulator creates a potential for negative learning, in that it may, because of limitations in the simulator being used, reinforce recovery techniques that may not work, and may in fact fail catastrophically, in real world conditions.

In prior art URT programs, ground-based motion simulation of aircraft has been considered using "six-post" or "hexapod" devices. (See FIG. 1.) In prior art URT programs, ground-based motion simulation of aircraft has also been considered using a Level D simulator. Level D is a simulator classification by the U.S. Federal Aviation Administration. (See FIG. 2.) Level D flight simulator devices have the following characteristics and components: (1) systems representations, switches, and controls which are required by the type design of the aircraft and by the user's approved training program; (2) systems which respond appropriately and accurately to the switches and controls of the aircraft being simulated; (3) full-scale replica of the cockpit of the aircraft being simulated; (4) correct simulation of the aerodynamic (including ground effect) and ground dynamic characteristics of the aircraft being simulated in the normal flight environment; (5) correct simulation of selected environmentally-affected aerodynamic and ground dynamic characteristics of the aircraft being simulated considering the full range of its flight envelope in all approved configurations; (6) correct and realistic simulation of the effects of environmental conditions which the aircraft might encounter; (7) control forces, dynamics, and travel which correspond to the aircraft; (8) instructor controls and seat; (9) a daylight, dusk, and night visual system with the minimum of a 75° horizontal by 30° vertical field of view for each pilot station; and (10) a motion system with at least 6 degrees of freedom. These devices are able to provide transient motion cues with little addition to the response time that a pilot senses. These devices are, however, not able to provide sustained acceleration or sustained motion cues. This means that flight fidelity is diminished in many maneuvers such as a basic coordinated turn and particularly during flight conditions that are outside the normal flight envelope. This missing fidelity does not allow training pilots to cope with vestibular and tactile illusions that routinely occur in flight.

What is needed is a method of upset recovery training that replicates the sustained motions and accelerations experienced in an actual upset condition, thereby allowing pilots to train to cope with the vestibular and tactile stresses that occur in both flight and in an upset condition.

SUMMARY OF THE INVENTION

Briefly, a process for providing upset recovery training includes using a sustained-G multi-axis platform (e.g., a centrifuge-based simulator).

Various embodiments of the present invention address an important aspect of URT that is not present in the prior art, namely the placing of physiological stresses on the trainees during URT, such as sustained motions including, but not limited to, elevated G-forces and prolonged rotational cues. Elevated G-forces and prolonged rotational cues can create many physiological challenges in the aircrew. These challenges can include motion discomfort, disorientation, and visual disturbances.

Various embodiments of the present invention provide URT that includes physiological stresses on the crew. If a pilot learns the correct procedures for recovery from an upset, as in the prior art URT programs, but cannot execute the procedures in the real world because he or she has not been prepared to cope with the physiological stresses to be faced, then safety is compromised. The URT process of the present invention addresses this deficiency.

DETAILED DESCRIPTION

Loss of Control continues to be a major factor in fatal aircraft accidents. Realistic training for this unpredictable and disorienting event is very difficult for a number of reasons. Prior art flight simulators cannot reproduce the sustained angular and G accelerations that would be present in an actual LOC situation. Upset recovery training in transport or normal category aircraft cannot be safely conducted because it is far too difficult and dangerous, and these aircraft are not designed to routinely handle the flight conditions associated with many upset conditions. Training done in aerobatic aircraft, while helpful, does not duplicate the skill set needed to recover a large aircraft and, in some cases, may actually hinder a large aircraft pilot's ability to recover since the flight performance and characteristics of the aerobatic aircraft do not match those of the transport/normal category aircraft.

Generally, embodiments of the present invention provide sustained G-force multi-axis simulator-based upset recovery training for pilots while advantageously accurately recreating the dynamics experienced while airborne.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The illustrative URT program disclosed herein, using a sustained G-force multi-axis platform, trains pilots to deal with the sensory assault that occurs during an upset.

Illustrative Embodiment

Figure 1:
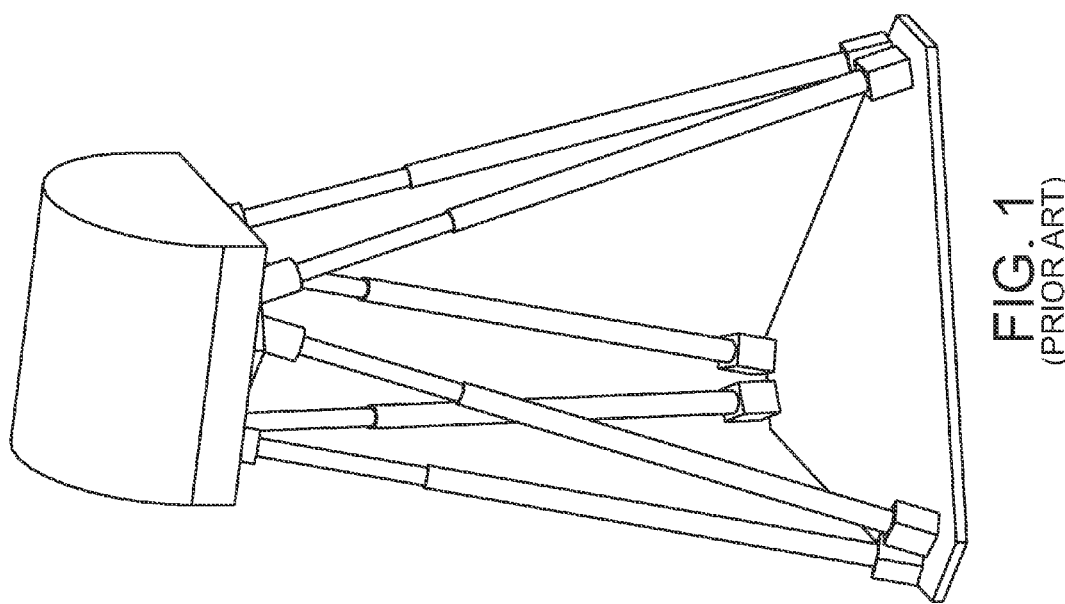
FIG. 1 illustrates a prior art "six post" or "hexapod" platform.
Figure 2:
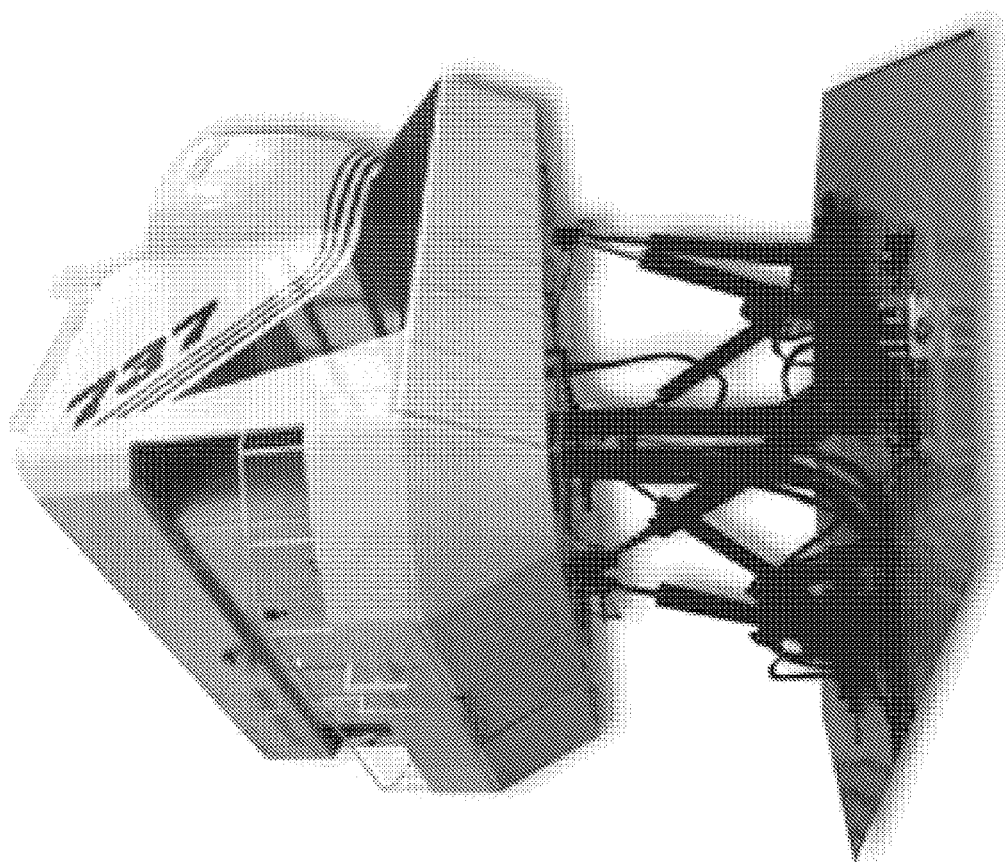
FIG. 2 illustrates a "Level D" simulator.
Figure 3:
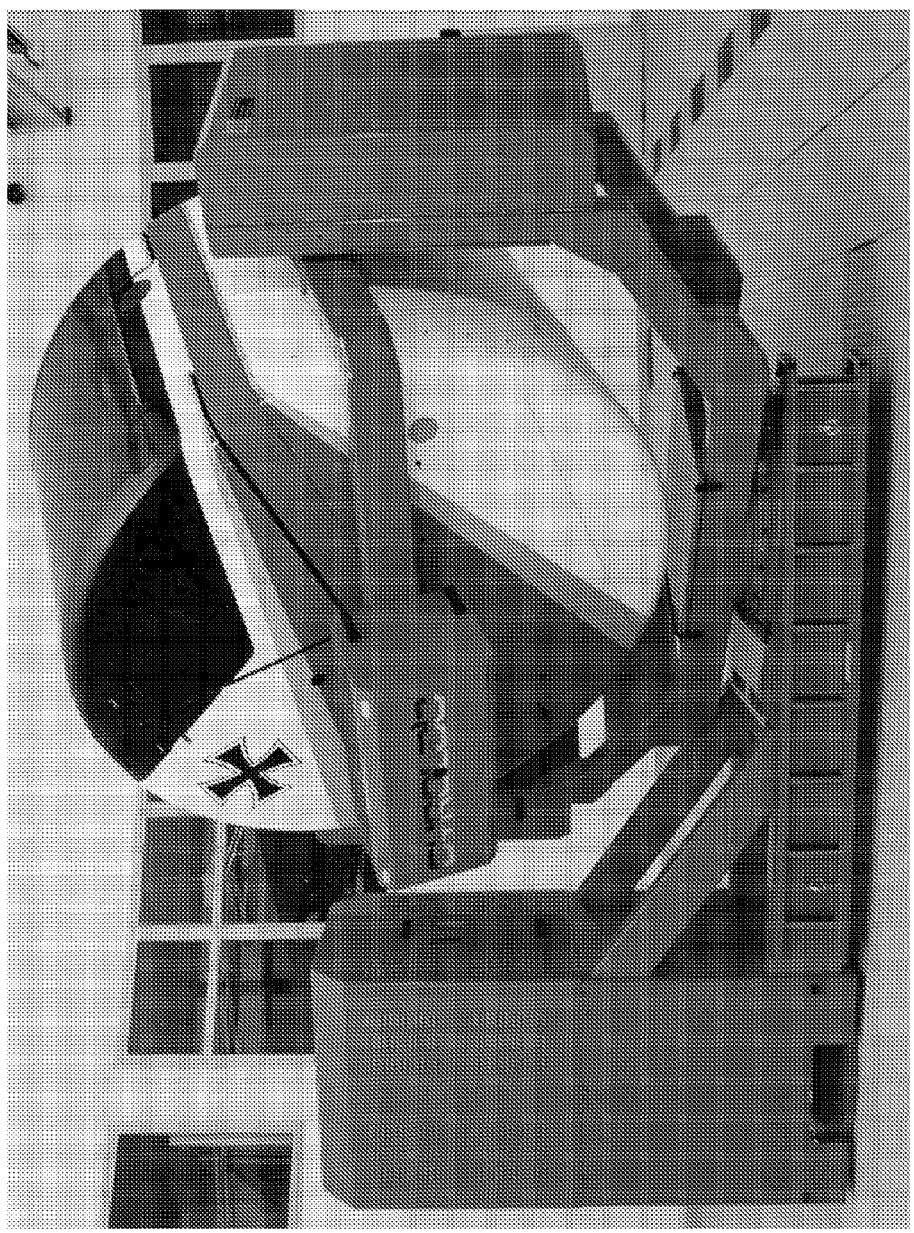
FIG. 3 illustrates a GYROLAB Advanced Spatial Disorientation Trainer interactive training system.

The GYROLAB Advanced Spatial Disorientation Trainer (ASDT), from Environmental Tectonics Corporation, is a state-of-the-art, interactive training system. See FIG. 3.

In the GYROLAB ASDT's simulated aircraft flight environment, trainees learn to rely on their flight instruments to maintain control. Interactive learning profiles and closed-loop flight controls allow the trainee to practice control actions.

The GYROLAB ASDT can simulate the in-flight stimulation of the visual, vestibular, and proprioceptive systems that can cause pilots to become disoriented while flying. The GYROLAB ASDT has the unique capability to provide controlled, sustained G-stimulation with its planetary axis, and ±360 degree rotation in the yaw, pitch and roll axes. These capabilities make the GYROLAB ASDT a powerful tool for URT, in addition to situational awareness training.

In the URT program in accordance with the present invention, the goal is to train pilots to return the aircraft to a controlled, stabilized flight with minimal deviations in altitude, airspeed, and heading while maintaining aircraft limits and avoiding impact with the ground and other aircraft. This is done through applying both a set of general skills and a set of specific techniques for given circumstances.

The URT program in accordance with the present invention provides the trainee with a general set of guidelines that must be interpreted and applied to the given upset situation.

With regard to the general set of guidelines, the trainees will be provided information on aircraft control, upset specifics, and recovery procedures and techniques. With respect to aircraft control, information on the basic premises of aircraft control beyond the normal flight envelope (i.e., extreme maneuvering) is provided. With respect to upset specifics, information regarding what makes an upset and how upsets are categorized is provided. With respect to recovery, information on a base set of procedures and techniques that can be applied is provided.

With regard to aircraft control, most commercial aviation flight training occurs in the normal flight envelope. However, upsets take place outside the normal flight envelope and (in some instances) beyond the operational limits of the aircraft. Thus, in order to recover from an upset, the pilot must learn to control the aircraft to a level greater than that learned in previous training.

The two most important skills in controlling an aircraft are lift vector control and energy management (EM). EM ensures that the aircraft energies are appropriately stored and expended. Lift vector control ensures that application of energies results in the correct aircraft motion. The basic flying skills that many commercially-trained pilots have been taught are sub-sets of lift vector control and EM focused on specific flight conditions in the center of the operating envelope.

With regard to lift vector control, lift vector is a term that refers to the magnitude and direction of the lifting force. The lift vector is generally pointed perpendicular to and away from the upper surface of the wing. The direction of the lift vector is controlled by bank and pitch. The nose of the airplane moves in the direction of the lift vector minus the effects of gravity.

Figure 4:
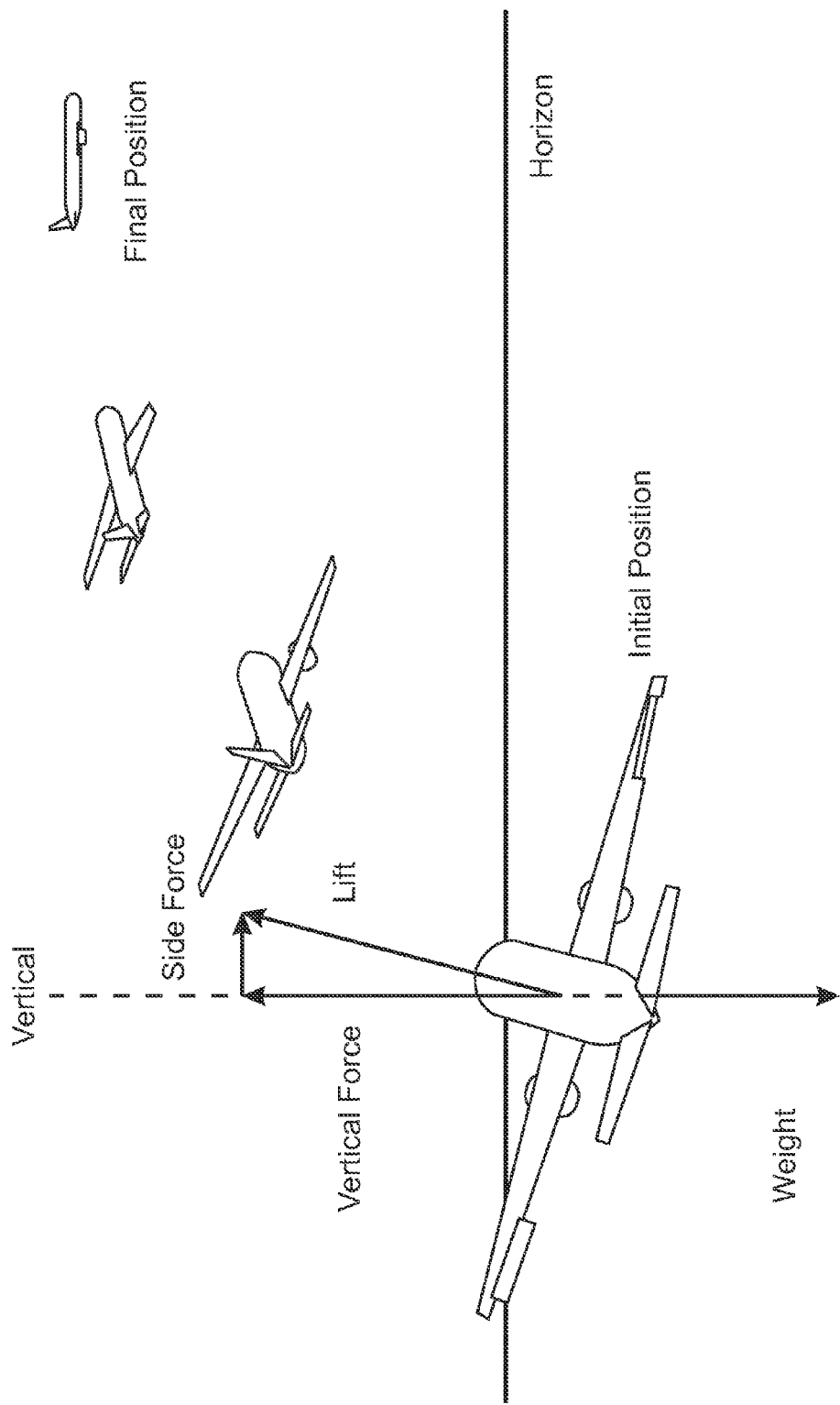
FIG. 4 illustrates lift vector control.

Most airline pilots have learned some basic concepts of lift vector control. They have been taught that an airplane turns by using the ailerons/spoilers to tilt the lift force in the direction of the turn. They have also been taught that when tilted, a component of the lifting force is used to the turn the airplane, hence they must increase the angle-of-attack (AoA) to account for the lift needed to turn. This is an example of lift vector control a depiction of which can be seen in FIG. 4.

The magnitude of the lift vector is called the load factor, or what is commonly called "G force." Load factor is measured in multiples of the force of gravity or "G's". For instance, if the airplane is generating twice as much lift as its weight it would then be experiencing a load factor of 2 or pulling 2 G's. In straight and level flight the lift vector is pointed up and has a load factor of approximately 1 G. Increasing load factor increases the rate at which the aircraft is expending energy.

Load factor also influences stall speed. At a given airspeed, load factor is increased by increasing AoA. As an airplane stalls at a fixed angle of attack, increasing load factor will bring you closer to or exceed the stall AoA. Exceeding the stall AoA is what is generally referred to as an accelerated stall. Conversely, a load factor of less than 1 corresponds to a reduction in AoA from straight and level flight. At a load factor of zero the airplane is not generating any lift and hence by definition cannot stall.

Given the relationship of load factor to stall and EM, reducing load factor in some upset recovery situations can be a effective method of avoiding loss of consciousness, increasing controllability, and reducing energy loss. The phrase "unloading an airplane" refers to the conscious act of decreasing load factor.

The total energy state of the aircraft is a combination of the dynamic energy of the airframe, consisting of altitude, airspeed and aircraft flight attitude, and the available energy from the engines. These energies must counteract the external forces at work on the airplane, namely gravity and drag. Knowledge of the energy state of the aircraft must become a constant part of the pilot's situational awareness.

An airplane possesses three kinds of energy. In order to effectively maneuver an aircraft, a pilot must learn to balance and apply those energies effectively. The three energy types are Kinetic Energy (KE), Potential Energy (PE) and Chemical Energy (CE). When a vehicle is in motion it possesses energy due to momentum. This energy is referred to as kinetic energy and increases with the square of true airspeed (TAS) for a given aircraft. Hence, higher airspeed equals higher kinetic energy. Potential energy is the energy an object has due gravity's ability to pull it towards the center of the Earth.

Hence, higher altitude results in higher potential energy. For example, if you push a cart up a hill, it can then roll back down the hill. By pushing the cart up the hill you have given that cart potential energy. Chemical energy results from the burning of fuel in the engine to create thrust. Chemical energy allows the pilot to add energy to the aircraft and keep it aloft. No fuel equals no chemical energy.

All three energy types are interrelated. For example, if you have high airspeed or high KE you can pull the nose up and gain altitude, or PE, but you will slow down, losing KE. This is called trading airspeed for altitude. Potential energy can be converted to kinetic energy by diving, which increases airspeed, or trading altitude for airspeed. Chemical energy is burning fuel which becomes thrust and is used to increase either kinetic energy or potential energy, i.e., used to increase airspeed or altitude respectively. Effectively controlling these energies and the relationships between them is what is meant by the expression "energy management".

A properly flying airplane has a balanced mix of all three energy types: KE, PE and CE. This involves keeping KE within limits (Vs [the stall speed, or minimum steady flight speed for which aircraft is still controllable] to $V_{NE}$ [the never exceed speed], G within limits), while ensuring adequate PE (safe altitude) and sufficient CE (fuel remaining).

Many upsets occur when an airplane is approaching or reaches an unsafe energy state. Recovering from an upset requires effective EM to restore and/or maintain the aircraft in a safe flight condition.

Since EM is a balance, applying energies to one parameter can cost in others. A common mistake made by pilots is to maximize performance of one parameter at the cost of the others that could be better budgeted to effect recovery. An example would be a scenario of an aircraft landing short of a runway. Many short landing incidents have taken place as a pilot, nearing the ground short of the runway, continues adding back pressure thereby increasing AoA in an attempt to arrest sink rate. The pilot in this case is max performing available AoA. Unfortunately, the increased AoA also increases drag reducing ground speed and increasing sink rate resulting in an even shorter touchdown. What may have been a more suitable response is to lower the nose decreasing drag, increasing airspeed and KE thus carrying the airplane further over the ground. While lowering the nose may be counterintuitive it would increase the likelihood of making the runway. This example of course is general and each situation must be judged on its own merits. The fact that no two incidents are alike is what makes EM a critical skill to learn and a difficult skill to teach.

Until now, pilots have been trained to fly their airplanes in the heart of its operating envelope (i.e., the normal flight envelope). Successful upset recovery maneuvering may require the pilot to fly the airplane to the edge of its limitations (i.e., extreme maneuvering). However, exceeding these limitations is dangerous, and in some cases could be more dangerous, than the initial upset. There are documented cases of air transport upsets where the airplane was recovered but the upset recovery maneuvering resulted in passenger injuries and fatalities. Accordingly, upset training includes training in extreme maneuvering, so that the pilot can safely and effectively control the aircraft in an upset situation.

In basic pilot training, pilots learn that $V_A$ is the maximum speed at which full smooth deflection of a single control surface can be applied without damaging the airframe. $V_A$ actually provides a more general metric of aircraft performance. $V_A$ is the airspeed where maximum allowable G and critical AoA coincide. At speeds below $V_A$ the aircraft is lift limited. In other words, KE is not sufficient to generate enough lift, and therefore G, to exceed structural limits. Excessive back pressure will result in a stall before limits are exceeded. At speeds above $V_A$, you will reach the maximum allowable G before you reach the critical AoA. In this case, excessive back pressure can generate G sufficient to exceed structural limits and airframe damage may result before the airplane stalls. Furthermore, the turn radius of an airplane is a function of G and airspeed, the maximum G and the minimum airspeed, which is again $V_A$, will give you the smallest turn radius, or in the case of a dive recovery the minimum altitude loss. For these reasons, a pilot must know the maneuvering speed of the aircraft so that he can fly the airplane appropriately for conditions.

Figure 5:
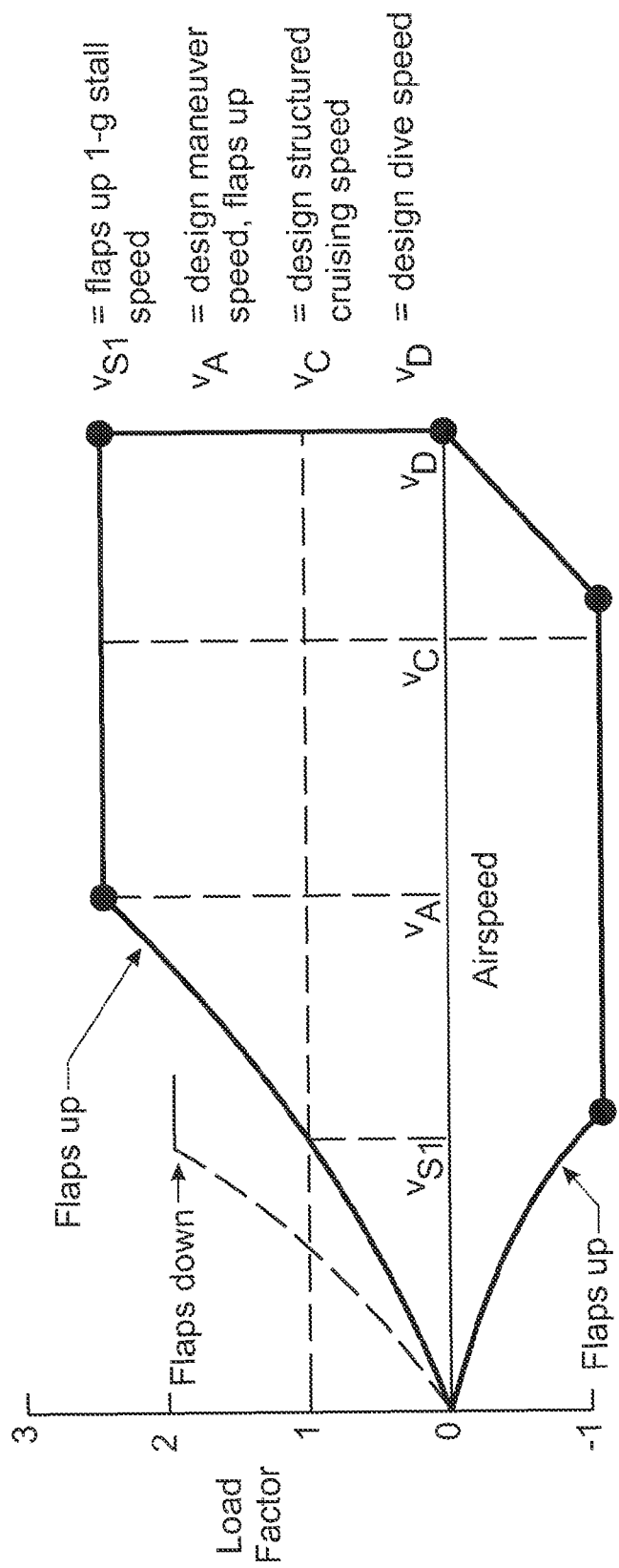
FIG. 5 illustrates an aircraft V-n diagram.

The relationship of aircraft limitations versus airspeed can be seen graphically in the aircraft V-n diagram an example of which is shown in FIG. 5. Every aircraft has a similar plot which shows the load factor limits of the aircraft as compared to airspeed. In the curved part of the diagram, below $V_A$, the airplane will stall at the load factor shown. Above $V_A$ the aircraft structural components are in danger of failing.

The definition of upsets and their causes are discussed above and in prior art training URT programs.

However, upsets are not just caused by external factors, but can be caused in the pilot response to an unfamiliar flight condition or to an improper response to an initial upset. The latter are referred to as secondary upsets. Most new pilots are not familiar with the indications and physical sensations associated with high G, and attitude maneuvering such as aerobatics or upset recovery. As a result, their responses to the initial upset may not be correct and may lead to a secondary upset.

Many pilots find themselves in real world upsets unprepared for the forces they will experience. The result can startle the pilot. This is followed by a cascading of perceptions due to unfamiliar motions and accelerations, which eventually overwhelm the pilot and lead to the pilot reverting to executing a previously learned skill that is appropriate for a similar, but different flight condition, which results in the selection and execution of an inappropriate skill. For example, a pilot who misdiagnoses a relatively benign upset, such as a mildly inverted (greater than 90 degrees of bank, but less than 180 degrees of bank)/nose low/low energy situation, may drastically exacerbate the problem by pulling back on the yoke, thereby increasing AoA and pulling through a "Split S" type of maneuver, dramatically increasing airspeed, losing altitude and overstressing the aircraft. In this case, the pilot reverted to a behavior that is appropriate for normal flight envelope flight (i.e., pull back on the yoke to gain altitude) that was completely inappropriate for the upset condition and executed that behavior because he misinterpreted the initial upset. So, while the initial event may have been externally induced, a resulting more severe upset may be caused by pilot misperceptions and lack of training to apply proper recovery actions. In addition, there is a dynamic interaction between a pilot's spatial orientation and upset recovery performance—there is a continuum of cause and effect: upset leads to disorientation and disorientation leads to upset.

Proper interpretation and reaction to the initial upset is critical in order to avoid these secondary upsets. The only real practical comparisons to maneuvering an airplane in a real world, high stress, and dynamic upset environments is a multi-axis, sustained motion, sustained G simulator or a real airplane. Historically most pilots have not received training in either. The URT program in accordance with the present invention addresses this deficiency.

In the URT program in accordance with the present invention, trainees receive training on upsets and recovery techniques in a classroom setting, and then the trainees will be asked to recover from a specific set of upset scenarios that correspond to selected actual accidents reported on by the National Transportation Safety Board (NTSB).

For the simulator training, the simulator will be set up to emulate a generic transport aircraft with flight characteristics that are similar to that of a commercial aircraft. Other set ups emulating other types of aircraft are possible.

During the simulator flights, the pilots are asked to recover from various upset conditions. Each upset scenario is typically automated. The simulator flies the pilot into the upset condition and the pilot is instructed to recover.

In accordance with the present invention, the simulator used is a multi-axis, sustained motion simulator that is capable of sustaining G-levels that would be encountered during the upset situation.

During the training, pilot performance data may be collected. Collected data may include, but is not limited to, flight control inputs, flight path data, G levels attained, reaction times, and closed circuit TV footage.

Physiological data may be taken in order to measure levels of stress during the upset and recovery. All physiological monitoring is typically noninvasive and preferably will not cause subject discomfort. The monitoring equipment may include, but is not limited to, a finger tip type pulse monitor; a cuff type blood pressure monitor; a temperature monitor that will applied via adhesive patch; two electrodes to measure eye movement that may be applied via adhesive patch, one above the eye and one outboard of the eye; and two elastic straps that may be placed around the abdomen to measure respiration rate and depth.

An illustrative URT program, in accordance with the present invention, may employ upset categories based on: Unusual Attitudes; Energy state; Structural conditions; and Environmental conditions. Unusual attitudes are summarized as follows:

No/Low Bank Angle, defined as 0° to 30° L/R (referenced to horizon).
High Bank Angle, defined as 31° to 90° L/R (referenced to horizon).
Inversion (inversion of aircraft referenced to longitudinal axis), defined as 90° to 270° (referenced to horizon).
Nose low, defined as −10° to −90° (referenced to horizon).
Nose high, defined as +20° to +90° (referenced to horizon).

Table I, below, lists upset categories that may also be employed:

TABLE I

| | Pitch Angle | Energy State | Bank Angle |
|---|---|---|---|
| 1 | High | High | No/Low |
| 2 | High | High | High |
| 3 | High | High | Inverted |
| 4 | High | Low | No/Low |
| 5 | High | Low | High |
| 6 | High | Low | Inverted |
| 7 | Low | High | No/Low |
| 8 | Low | High | High |
| 9 | Low | High | Inverted |
| 10 | Low | Low | No/Low |
| 11 | Low | Low | High |
| 12 | Low | Low | Inverted |

The following upset categories may also be employed: Out of Control (OOC) Flight, such as Stalls, Spins, Overspeeds, Underspeeds, and Departures from controlled flight; Environmental (e.g., wake turbulence or severe weather); and Mechanical (e.g., aircraft structural damage or malfunction).

Figure 6:
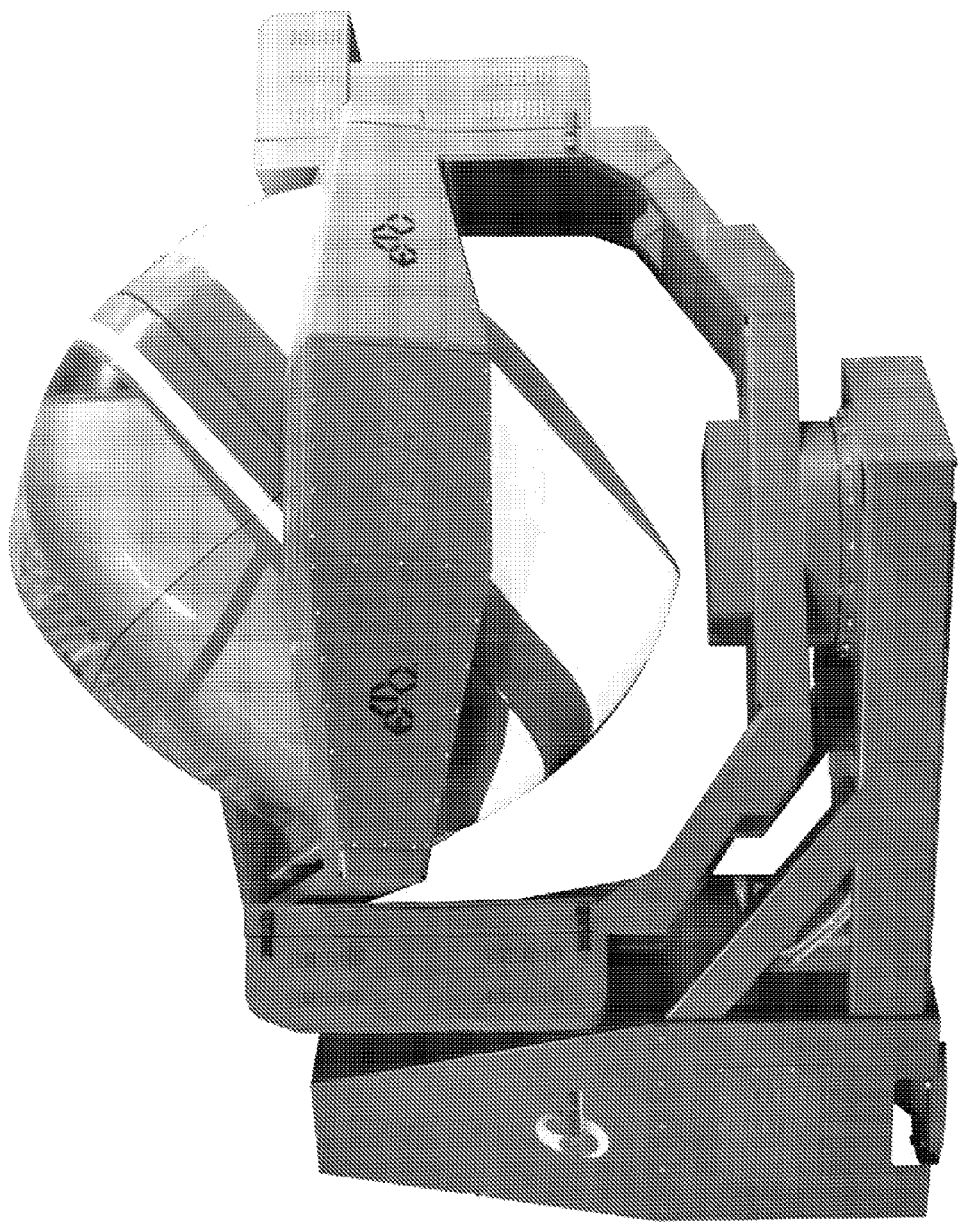
FIG. 6 illustrates a GYROLAB GL-1500 simulator.

In an alternative embodiment, the URT Program of the present invention is provided using a simulator similar to the GL-1500, manufactured by Environmental Tectonics Corporation. See FIG. 6.

In a further alternative embodiment, the URT Program in accordance with the present invention is provided using a simulator similar to the GL-2000, manufactured by Environmental Tectonics Corporation. See FIG. 3. The GL-2000 is one of the simulators used to conduct the URT program in accordance with the present invention. It is designed to keep pace with changing training needs. An Interactive Profile Editor allows instructors to change any existing training profiles or create new training profiles as their students' training needs dictate. Interactive learning profiles and closed-loop flight controls allow the trainee to practice control actions. The Interactive Profile Editor features a familiar and easy to use Windows® based Graphical User Interface.

Figure 7:
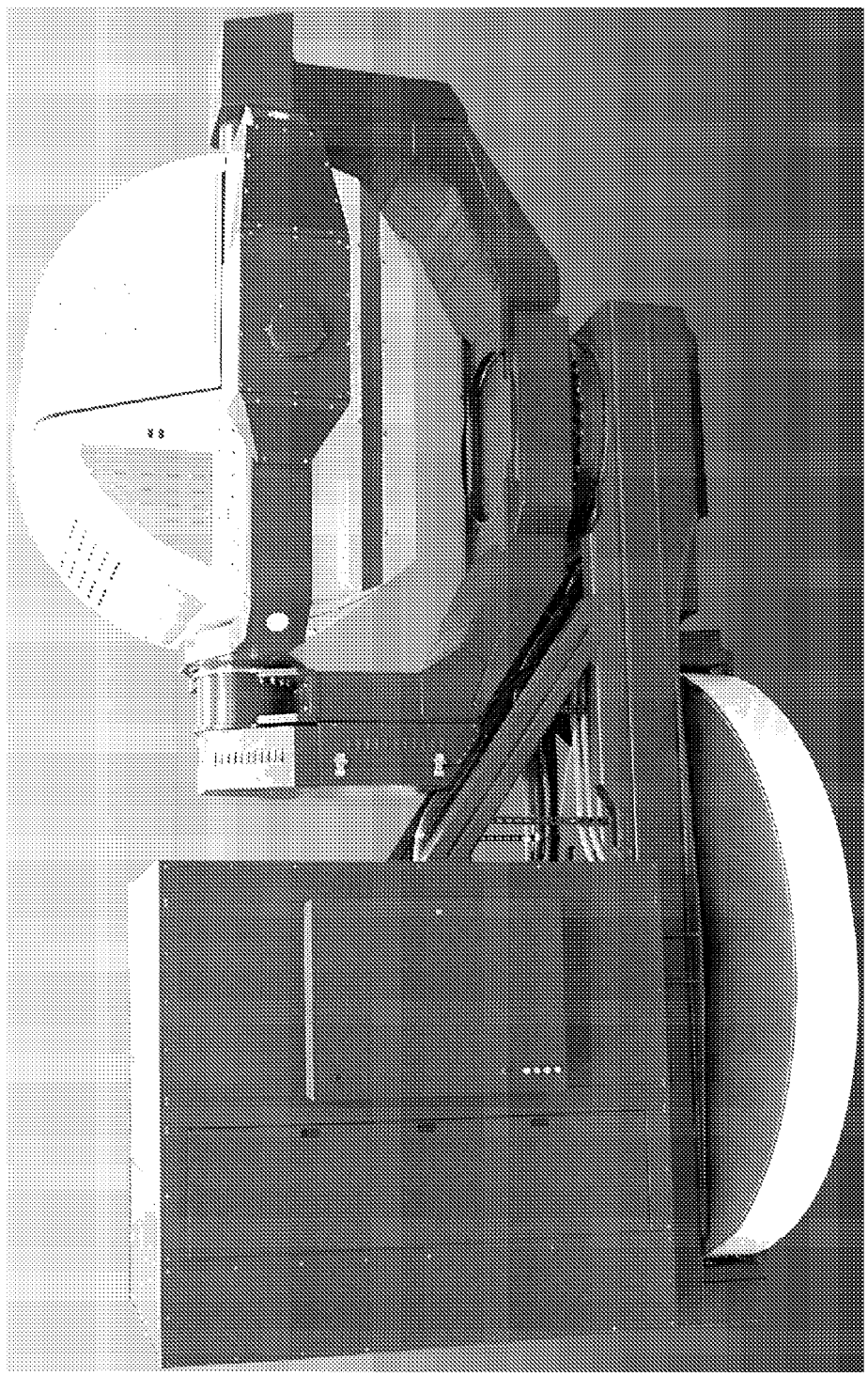
FIG. 7 illustrates a GYROLAB GL-2500 simulator.

In a further alternative embodiment, the URT Program in accordance with the present invention is provided using a simulator similar to the GL-2500, manufactured by Environmental Tectonics Corporation. See FIG. 7.

Figure 8:
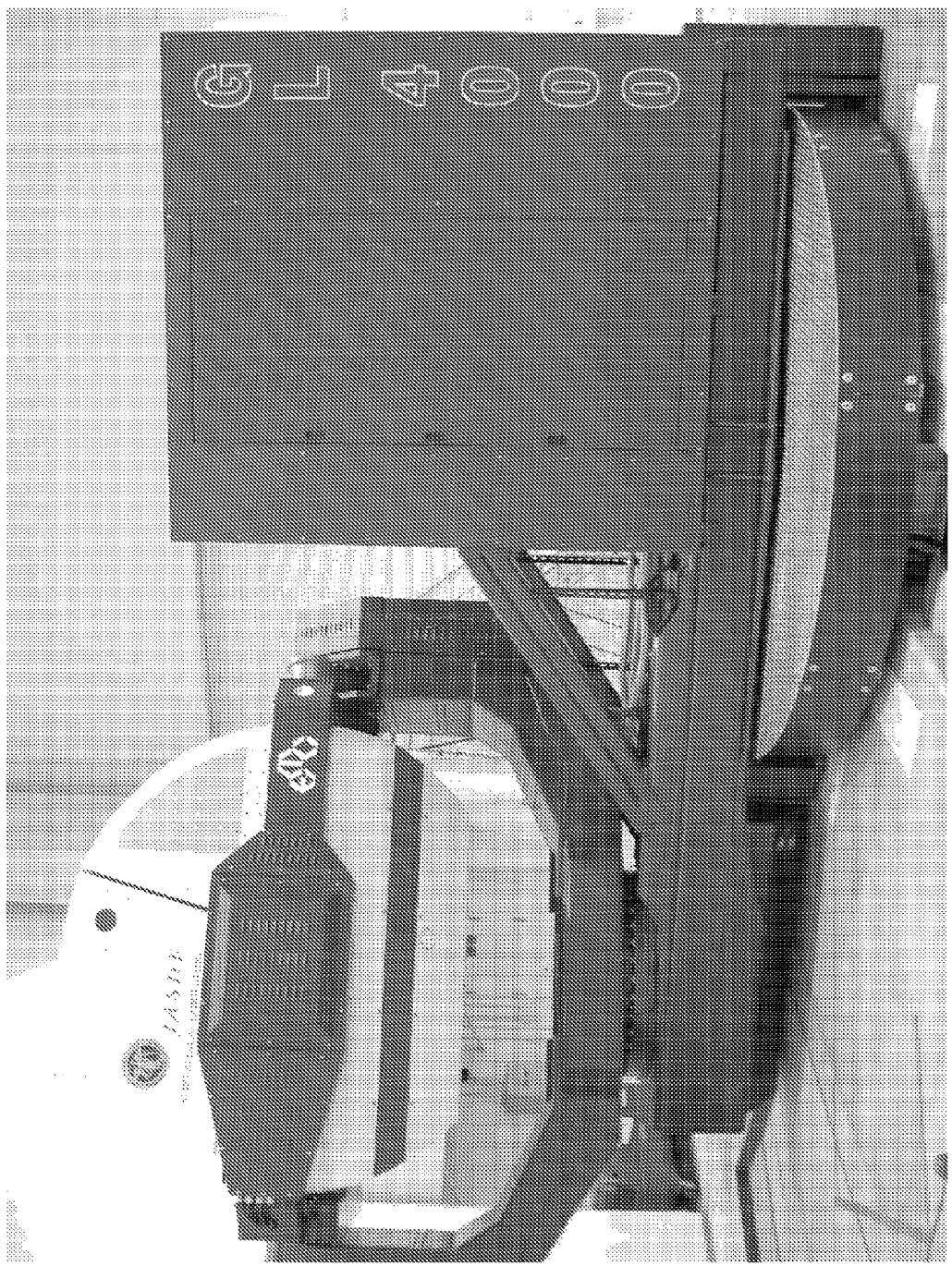
FIG. 8 illustrates a GYROLAB GL-4000 simulator.
Figure 9:
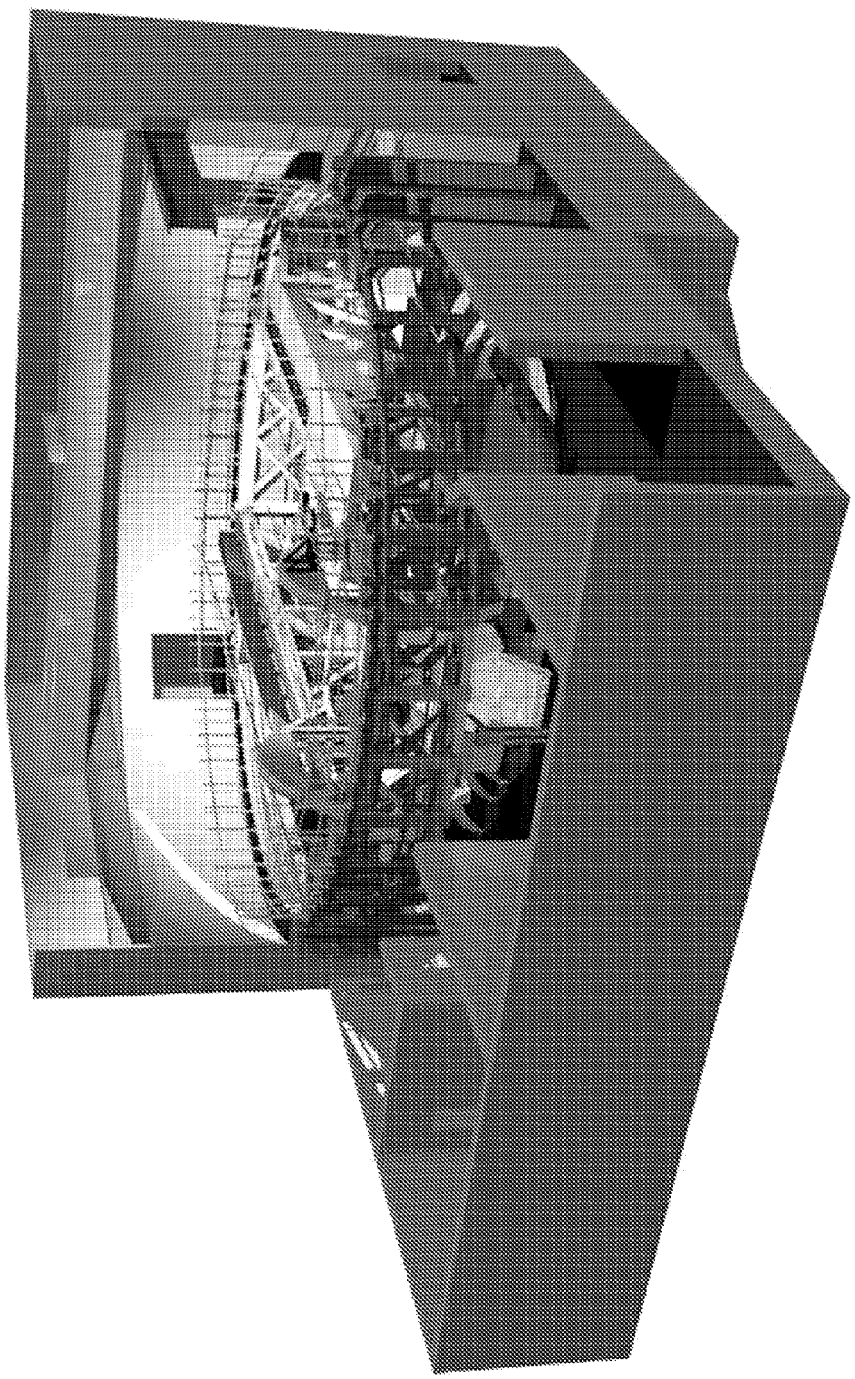
FIG. 9 illustrates a GYROLAB GL-6000 simulator.

In a further alternative embodiment, the URT program in accordance with the present invention is provided using a simulator similar to the GL-4000, manufactured by Environmental Tectonics Corporation. See FIG. 8. The GL-4000 offers sustained G motion cueing in a high fidelity Authentic Tactical Flight Simulator. It combines full-fidelity and sustained G motion cueing. A pilot can experience the same mission stress scenarios incurred when flying a real aircraft in the GL-4000. This capability results in maximum learning benefits. The GL-4000 is controlled by the pilot's commands in response to perceived flight conditions in the device. It accurately replicates the three components of rectilinear acceleration which are produced by a maneuvering aircraft. The advantage of a sustained G dynamic flight simulator over conventional simulators is the capability to produce sustained elevated G levels and a realistic, yet safe, controlled flight environment.

In a still further alternative embodiment, the URT Program in accordance with the present invention is provided using a simulator similar to the GL-6000, manufactured by Environmental Tectonics Corporation. The GL-6000 offers advanced capabilities in motion technology for research and training in short takeoff and landing (STOL), vertical takeoff and vertical landing (VTOL), and short takeoff and vertical landing (STOVL) dynamic flight, flight phase transition training, dynamic G tolerance and spatial orientation; and includes six axes of motion (rotary, pitch, roll, yaw, vertical, heave), 360 degree continuous rotation in four axes (rotation, pitch, roll, yaw), ±3 feet vertical travel, maximum G of ±3 Gx, Gz, and Gy, and a wide field of view visual display. The GL-6000 also offers capabilities in situational awareness, fatigue countermeasures and adaptation to unusual acceleration environments. The GL-6000 also supports research in road vehicle, cars and trucks. This advanced training and research device is compatible with interchangeable cockpits with wide field-of-view visual displays and medical and performance monitoring and data acquisition.

One illustrative method of operating a flight training simulator, in accordance with the present invention includes providing a sustained G, multi-axis, centrifuge-based flight training simulator having a cockpit unit with ±360 degrees rotation in the yaw, pitch and roll axes; providing the flight simulator with an operational profile of a pre-determined aircraft; and operating the sustained G, multi-axis, centrifuge-based flight training simulator to provide an upset condition; wherein the operation of the flight training simulator produces continuous G forces and/or rotational cues during the simulated flight, the continuous G forces substantially matching the actual G forces occurring in an aircraft during the same upset condition.

An illustrative method of upset recovery training, includes providing a sustained G, multi-axis, centrifuge-based flight simulator having a cockpit unit with ±360 degrees rotation in the yaw, pitch and roll axes; providing the flight simulator with an operational profile of a pre-determined aircraft; operating the sustained G, multi-axis, centrifuge-based flight simulator to provide an upset condition; and exposing a trainee to continuous G forces and rotational cues, during the operation of the flight simulator, the continuous G forces substantially matching the actual G forces occurring in an aircraft during the same upset condition.

Another illustrative method of upset recovery training, includes providing a sustained G, multi-axis, centrifuge-based flight simulator having a cockpit unit with ±360 degrees rotation in the yaw, pitch and roll axes; providing the flight simulator with an operational profile of a pre-determined aircraft; operating the sustained G, multi-axis, centrifuge-based flight simulator to provide an upset condition; and exposing a trainee to a set of continuous motions and G forces, during the operation of the flight simulator, the set of continuous motions and G forces substantially matching the actual G forces occurring in the pre-determined aircraft during the same upset condition such that spatial disorientation occurs in the trainee.

Conclusion

The exemplary methods and apparatus illustrated and described herein find application in at least the fields of upset recovery training, spatial disorientation training, and flight simulation.

Through the employment of advanced simulation devices and methods in accordance with the present invention, aviators can be exposed to normally dangerous flight conditions in a safe and controlled environment. Recreation of aircraft upsets caused by any number of reasons, such as human error, mechanical malfunctions, environmental conditions, and so on, allows aviators to explore the extremes of the flying envelope in order to develop the needed skills and techniques to prevent a disaster. URT methods and apparatus in accordance with the present invention allow trainees to gain confidence as they experience a multitude of scenarios that include aspects such as spatial disorientation, wake turbulence, and mechanically induced errors. Trainees experience the effects of relevant human factors (e.g., physiological, psychological) that are difficult if not dangerous to recreate while airborne.

One advantage of the present invention is an increase in an aviator's situational awareness and airmanship so that if an upset condition is encountered, then the aviator can safely recover the aircraft to normal flight parameters.

It will be understood that various other changes in the details, materials, and arrangements of the parts and steps which have been described and illustrated in order to explain the nature of this invention may be made by those skilled in the art without departing from the principles and scope of the invention as expressed in the subjoined Claims and their equivalents.

What is claimed is:

1. A method of upset recovery training, comprising:
providing a sustained G, multi-axis, centrifuge-based flight simulator having a cockpit unit with ±360 degrees rotation in the yaw, pitch and roll axes;
providing the flight simulator with an operational profile of a pre-determined aircraft;
operating the sustained G, multi-axis, centrifuge-based flight simulator to provide a first-upset condition corresponding to a simulated-environmentally induced event including at least one of the following events: turbulence; clear air turbulence, mountain wave turbulence, wind shear, thunderstorms, microbursts, wake turbulence, and airplane icing;

exposing a trainee to a first set of continuous motions and G forces, during the operation of the flight simulator, the first set of continuous motions and G forces substantially matching the actual G forces occurring in the pre-determined aircraft during the first upset condition such that spatial disorientation occurs in the trainee;

receiving, at the flight simulator, flight control inputs from the trainee in response to the first-upset condition;

operating the sustained G, multi-axis, centrifuge-based flight simulator to provide a second-upset condition in response to incorrect-flight control inputs received from the trainee in response to the first-upset condition, wherein the second-upset condition is inadvertently induced by the trainee; and exposing the trainee to a second set of continuous motions and G forces, during the operation of the flight simulator, wherein the second set of continuous motions and G forces are different than first set of continuous motions and G forces, and wherein the second set of continuous motions and G forces substantially match the actual G forces occurring in the pre-determined aircraft during the second-upset condition, such that spatial disorientation occurs in the trainee.

2. The method of claim 1, wherein the first or second upset condition includes a selected one of the group of conditions consisting of pitch attitude greater than 25 degrees nose up; pitch attitude greater than 10 degrees nose down; bank angle greater than 45 degrees; and flying at airspeeds inappropriate for the conditions.

3. The method of claim 1, wherein the first or second upset condition comprises an unusual attitude, wherein the unusual attitude is selected from the group of conditions consisting of a No/Low Bank Angle, consisting of an angle between 0° and 30° L/R referenced to the horizon; a High Bank Angle, consisting of an angle between 31° and 90° L/R referenced to the horizon; Inversion, consisting of an angle between 90° and 270° referenced to the horizon and rotation about a longitudinal axis; and Nose low consisting of an angle between −10° to −90° referenced to the horizon; and Nose high, consisting of an angle +20° to +90° referenced to the horizon.

4. The method of claim 3, wherein the first or second upset condition includes a Nose High pitch angle and a No/Low Bank Angle.

5. The method of claim 3, wherein the first or second upset condition includes a Nose High pitch angle and a High Bank Angle.

6. The method of claim 3, wherein the first or second condition includes a Nose High pitch angle and an Inverted Bank angle.

7. The method of claim 3, wherein the first or second-upset condition includes a Nose High pitch angle and an No/Low Bank angle.

8. The method of claim 3, wherein a the first or second upset condition includes a Nose High pitch angle and a High Bank angle.

9. The method of claim 3, wherein the first or second upset condition includes a Nose High pitch angle and an Inverted Bank angle.

10. The method of claim 3, wherein the first or second upset condition includes a Nose Low pitch angle and a No/Low Bank angle.

11. The method of claim 3, wherein the first or second upset condition includes a Nose Low pitch angle-and a No/Low Bank angle.

12. The method of claim 3, wherein the first or second upset condition includes a Nose Low pitch angle and an Inverted Bank angle.

13. The method of claim 3, wherein the first or second upset condition includes a Nose Low pitch angle and a No/Low Bank angle.

14. The method of claim 3, wherein the first or second upset condition includes a Nose Low pitch angle and a High Bank angle.

15. The method of claim 3, wherein the first or second upset condition includes a Nose Low pitch angle and an Inverted Bank angle.

16. The method of claim 1, further comprising collecting pilot performance data.

17. The method of claim 16, wherein pilot performance data includes one or more of the group consisting of flight control inputs, flight path data, G levels attained, reaction times, and closed circuit N footage.

18. A method of upset recovery training, comprising:
providing a sustained G, multi-axis, centrifuge-based flight simulator having a cockpit unit with ±360 degrees rotation in the yaw, pitch and roll axes;
providing the flight simulator with an operational profile of a pre-determined aircraft;
operating the sustained G, multi-axis, centrifuge-based flight simulator to provide a first-upset condition corresponding to a simulated-environmentally induced event; and
exposing a trainee to continuous rotational cues, during the operation of the flight simulator, the continuous rotational cues substantially matching the actual rotational cues occurring in the pre-determined aircraft during the first-upset condition; and
receiving, at the flight simulator, flight control inputs from the trainee in response to the first-upset condition;
operating the sustained G, multi-axis, centrifuge-based flight simulator to provide a second-upset condition based on the flight control inputs received from the trainee in response to the first-upset condition, wherein the second-upset condition is inadvertently induced by the trainee as a result of attempting to recover from the first-upset condition; and
exposing the trainee to a set of continuous motions and G forces, during the operation of the flight simulator, wherein set of continuous motions and G forces substantially match the actual G forces occurring in the pre-determined aircraft during the second-upset condition, such that spatial disorientation occurs in the trainee.

19. The method of claim 18, wherein the first or second upset condition is outside the normal operational envelope of the pre-determined aircraft.

20. The method of claim 18, wherein the second upset condition is a stall.

21. The method of claim 18, wherein the first or second upset condition is a spin.

22. The method of claim 18, wherein the second upset condition is an overspeed condition.

23. The method of claim 18, wherein the second upset condition is an underspeed condition.

24. The method of claim 18, wherein the first upset condition is wake turbulence.

25. The method of claim 18, wherein the first upset condition is aircraft structural damage.

26. The method of claim 18, wherein the first upset condition is an aircraft malfunction.

* * * * *